(12) United States Patent
Thompson

(10) Patent No.: US 11,130,053 B2
(45) Date of Patent: Sep. 28, 2021

(54) GAME CONTACTING SMART OBJECTS

(71) Applicant: Rhenae Andre Thompson, Rowlett, TX (US)

(72) Inventor: Rhenae Andre Thompson, Rowlett, TX (US)

( * ) Notice: Subject to any disclaimer, the term of this patent is extended or adjusted under 35 U.S.C. 154(b) by 228 days.

(21) Appl. No.: 16/249,221

(22) Filed: Jan. 16, 2019

(65) Prior Publication Data

US 2020/0061462 A1 Feb. 27, 2020

Related U.S. Application Data

(60) Provisional application No. 62/765,383, filed on Aug. 23, 2018.

(51) Int. Cl.
*A63F 13/31* (2014.01)

(52) U.S. Cl.
CPC .................................... *A63F 13/31* (2014.09)

(58) Field of Classification Search
CPC ...... A63F 2007/0011; A63F 2007/0029; A63F 2007/0035; A63F 2007/0052; A63F 2007/0064; A63F 2007/4006; A63F 7/20; A63F 7/24; A63F 7/027; A63F 7/06; A63F 7/0058; A63F 7/305; A63F 7/306; A63F 9/02; A63F 9/0204; A63F 9/0278; A63F 13/31; A63F 13/46; A63F 13/50; A63F 13/816; A63F 2300/8011
See application file for complete search history.

(56) References Cited

U.S. PATENT DOCUMENTS

| | | | |
|---|---|---|---|
| 4,676,511 A | 6/1987 | Mackie | |
| 5,316,296 A | 5/1994 | Ben-Zirma et al. | |
| 5,855,372 A | 1/1999 | Thiemann | |
| 7,951,021 B2 | 5/2011 | Lessack | |
| 8,002,283 B1 | 8/2011 | Jones | |
| 8,663,040 B2 | 3/2014 | Kortegast | |
| D704,555 S | 5/2014 | Hernandez | |
| 2014/0309058 A1* | 10/2014 | San Juan | A63B 71/0622 473/422 |
| 2016/0195369 A1 | 7/2016 | Perry et al. | |
| 2019/0126115 A1* | 5/2019 | Yip | A63B 67/066 |

FOREIGN PATENT DOCUMENTS

EP 186486 7/1986

* cited by examiner

*Primary Examiner* — Omkar A Deodhar
(74) *Attorney, Agent, or Firm* — Smith & Woldesenbet Law Group, PLLC

(57) ABSTRACT

An interactive game can include a first target object comprising a first body, a first controller, and a first sensor coupled to the first controller, where the first sensor measures a parameter that indicates when the first body is contacted. The interactive game can also include an initiating object, and a first player positioned a distance from the first target object, where the first player propels the initiating object toward the first target object. The first controller, based on the first parameter measured by the first sensor, can determine when the initiating object contacts the first target object and awards a point to the first player for contacting the first target object. The first controller can communicate a score of the first player to the first player.

18 Claims, 11 Drawing Sheets

GAME CONTACTING SMART OBJECTS

CROSS-REFERENCE TO RELATED APPLICATIONS

This application claims priority under 35 U.S.C. § 119 to U.S. Provisional Patent Application Ser. No. 62/765,383, titled "Cans" and filed on Aug. 23, 2018, the entire contents of which are hereby incorporated herein by reference.

TECHNICAL FIELD

Embodiments described herein relate generally to a game, and more particularly to systems, methods, and devices for a game contacting smart objects.

BACKGROUND

With the implementation of more advanced electronic technologies, people are becoming less active. For example, social media and gaming tend to keep people, particularly children and young adults, less active. This inactivity can have detrimental impacts on the health of those people. In this way, encouraging people, especially younger people, to be active can lead to better health in the short and long term.

SUMMARY

In general, in one aspect, the disclosure relates to an interactive game that includes a first target object having a first body, a first controller, and a first sensor coupled to the first controller, where the first sensor measures a parameter that indicates when the first body is contacted by an initiating object. The initiating object can be propelled toward the first target object by a first player positioned a distance from the first target object. The first controller, based on the first parameter measured by the first sensor, can determine when the initiating object contacts the first target object and awards a point to the first player for contacting the first target object. The first controller can communicate a score of the first player to the first player.

In another aspect, the disclosure can generally relate to a target object used in an interactive game. The target object can include a body that forms a cavity, and an interactive system. The interactive system can include a sensor that measures a parameter indicative of whether the body is contacted. The interactive system can also include a controller coupled to the sensor, where the controller determines, based on a measurement received from the sensor, that the body is contacted. The interactive system can further an interface disposed on the housing, where the interface communicates to a player of the interactive game that a score of the player is incremented by a point when the controller determines that the body is contacted.

In yet another aspect, the disclosure can generally relate to a method for overseeing an interactive game. The method can include receiving a first parameter measurement of a first parameter measured by a first sensor, where the first parameter indicates movement of a first body of a first target object, where the movement of the first body is caused by an initiating object propelled toward the first body by a first user. The method can also include determining whether the first parameter measurement exceeds a first threshold value. The method can further include incrementing a first count of the first user associated with the first object when the first parameter measurement exceeds a first threshold value. The method can also include communicating the first count to the first user.

These and other aspects, objects, features, and embodiments will be apparent from the following description and the appended claims.

BRIEF DESCRIPTION OF THE DRAWINGS

The drawings illustrate only example embodiments of a game contacting smart objects and are therefore not to be considered limiting of its scope, as a game contacting smart objects may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

Figure 1A:
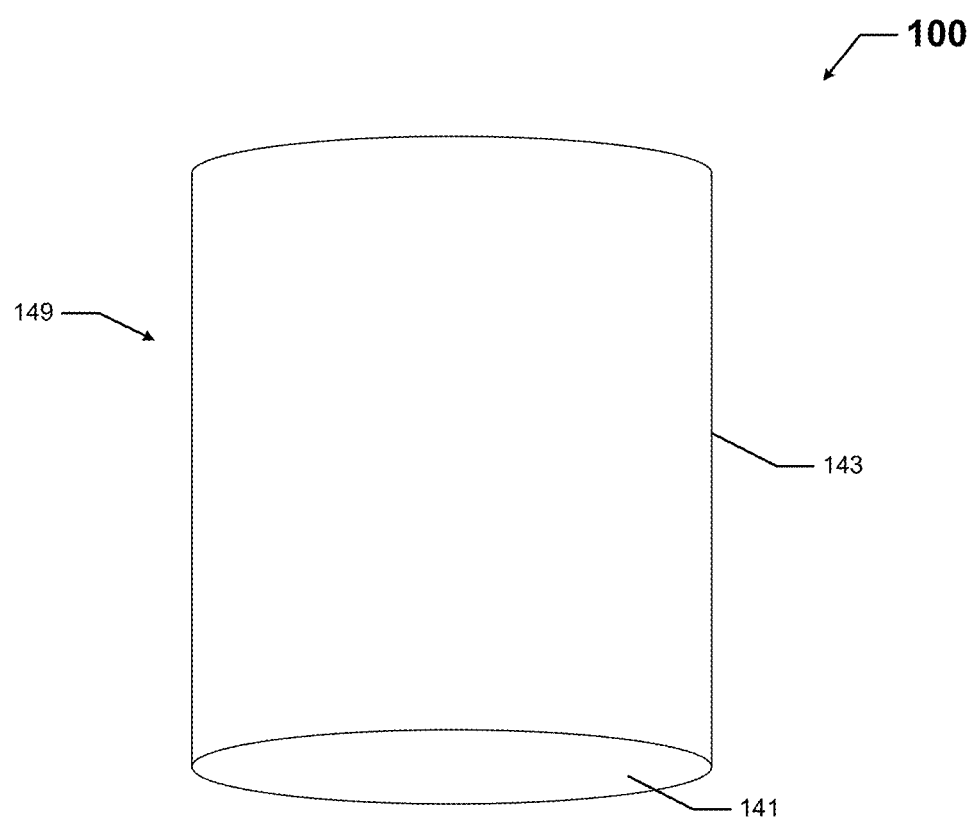
FIGS. 1A-1D show various views of a target object in accordance with certain example embodiments.

The example embodiments discussed herein are directed to systems, apparatuses, and methods of a game contacting smart objects. In certain example embodiments, the game involves at least one can having an example interactive system. While example interactive systems described herein are directed to cans, example interactive systems can also be incorporated into other objects. Examples of such other objects can include, but are not limited to, bowling pins, balls, action figures, stuffed animals, and blocks. Objects that have interactive systems incorporated therein can be used in any of a number of environments or conditions, including but not limited to indoors, outdoors, high humidity, wet, high altitude, hot temperatures, and sub-freezing temperatures.

In the foregoing figures showing example embodiments of a game contacting smart objects, one or more of the components shown may be omitted, repeated, and/or substituted. Accordingly, example embodiments of a game contacting smart objects should not be considered limited to the specific arrangements of components shown in any of the figures. For example, features shown in one or more figures or described with respect to one embodiment can be applied to another embodiment associated with a different figure or description. Further, any description of a figure or embodiment made herein stating that one or more components are not included in the figure or embodiment does not mean that such one or more components could not be included in the figure or embodiment, and that for the purposes of the claims set forth herein, such one or more components can be included in one or more claims directed to such figure or embodiment.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three or four digit number and corresponding components in other figures have the identical last two digits.

In certain example embodiments, the systems (or portions thereof) that are described herein must comply with one or more of a number of standards, codes, regulations, and/or other requirements established and maintained by one or more entities. Examples of such entities include, but are not limited to, Underwriters' Laboratories (UL), the National Electric Code (NEC), and the U.S. Consumer Products Safety Commission (CPSC).

Example embodiments of a game contacting smart objects will be described more fully hereinafter with reference to the accompanying drawings, in which example embodiments of a game contacting smart objects are shown. A game contacting smart objects may, however, be embodied in many different forms and should not be construed as limited to the example embodiments set forth herein. Rather, these example embodiments are provided so that this disclosure will be thorough and complete, and will fully convey the scope of a game contacting smart objects to those of ordinary skill in the art. Like, but not necessarily the same, elements (also sometimes called components) in the various figures are denoted by like reference numerals for consistency.

Terms used herein such as, but not limited to, "top", "bottom", "side", "within", "left", "right", "first", and "second" are used merely to distinguish one component (or part of a component or state of a component) from another. Such terms are not meant to denote a preference or a particular orientation, and are not meant to limit embodiments of a game contacting smart objects. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figures 1B, 1C:
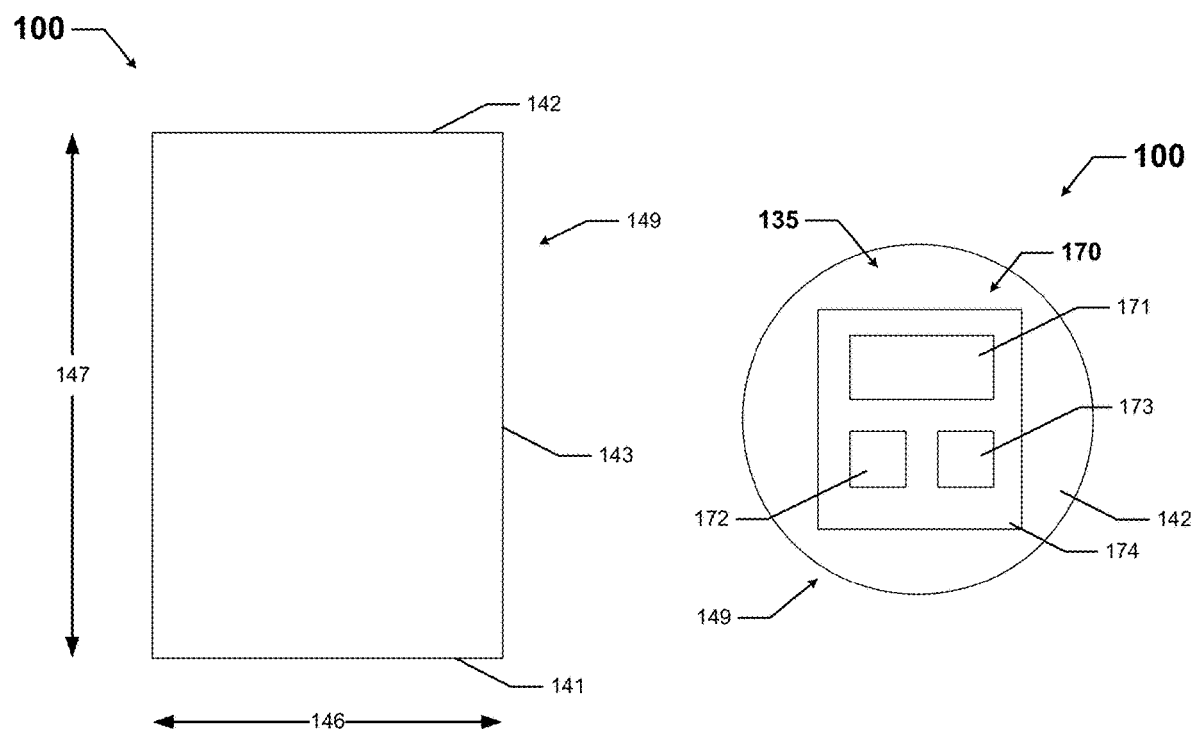
Figure 1D:
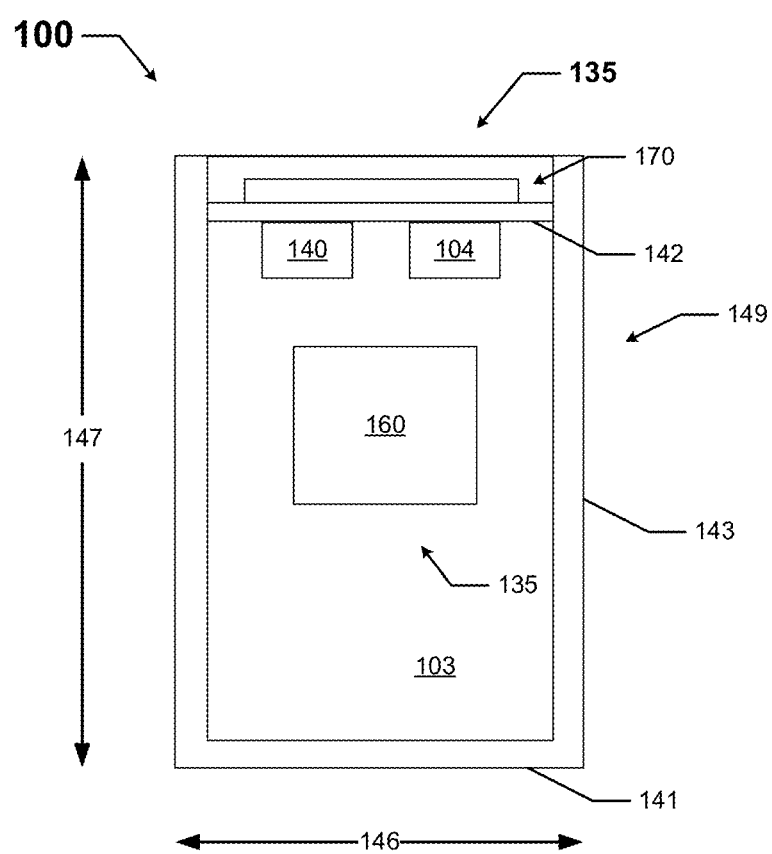

FIGS. 1A-1D show various views of a target object 100 in accordance with certain example embodiments. Specifically, FIG. 1A shows a bottom front perspective view of the object 100. FIG. 1B shows a side view of the object 100. FIG. 1C shows a top view of the object 100. FIG. 1D shows a cross-sectional side view of the object 100. Referring to FIGS. 1A through 1D, the object 100 in this case is a can. The object 100 (or any object discussed herein) can also be referred to as a target object 100 herein because, in the game in which the object 100 is used, the object 100 is targeted by a player of the game. The object 100 can also be referred to as a smart object, because the example interactive system 135 provides automated facilitation of the game for which the object 100 is used.

The object 100 in this case has a body 149, which has a top surface 142, a bottom surface 141, and at least one side surface 143. The shape of the body 149 of the object 100 in this example is cylindrical, having a height 147 and a diameter/width 146. The body 149 of the example 100 can have any of a number of other three-dimensional shapes, including but not limited to cubic, spherical, conical. These aforementioned shapes of the body 149 of an example object 100 are all symmetrical along a vertical axis or plane, but the shape of the body 149 of an example object 100 can also be asymmetrical with respect to a vertical axis or plane. In other words, the body 149 of an example object 100 can have any shape and/or size.

Figure 9:
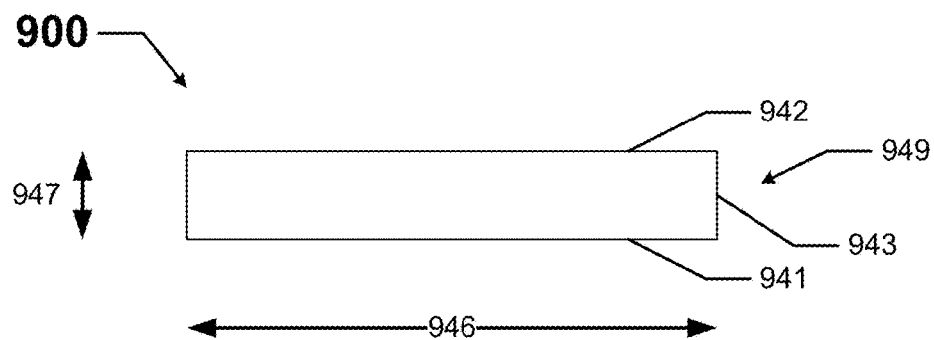
FIG. 9 shows another target object in accordance with certain example embodiments.
Figure 10:
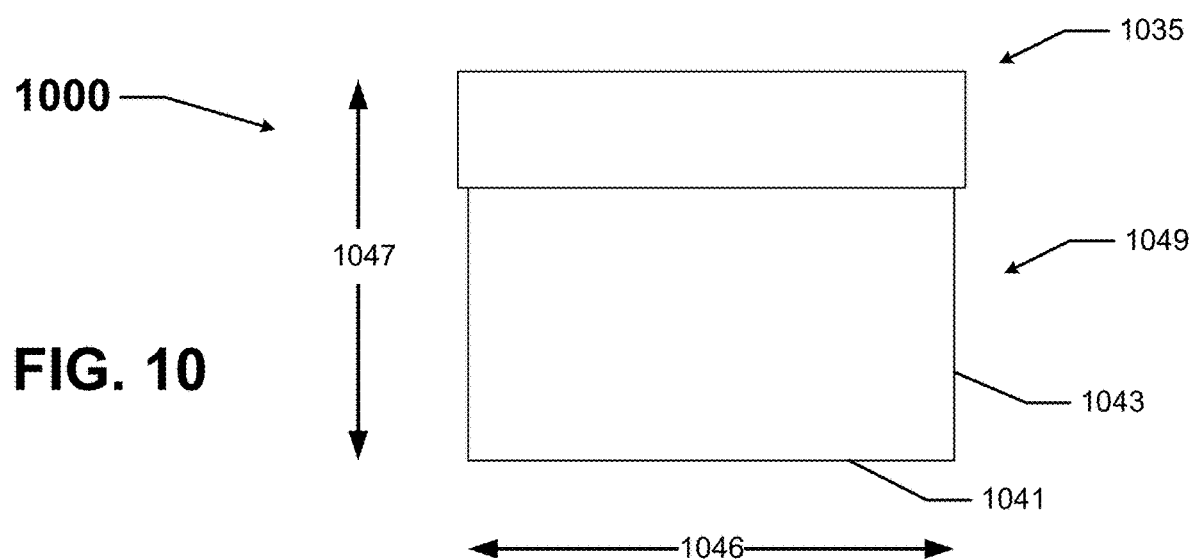
FIG. 10 shows yet another target object in accordance with certain example embodiments.
Figure 11:
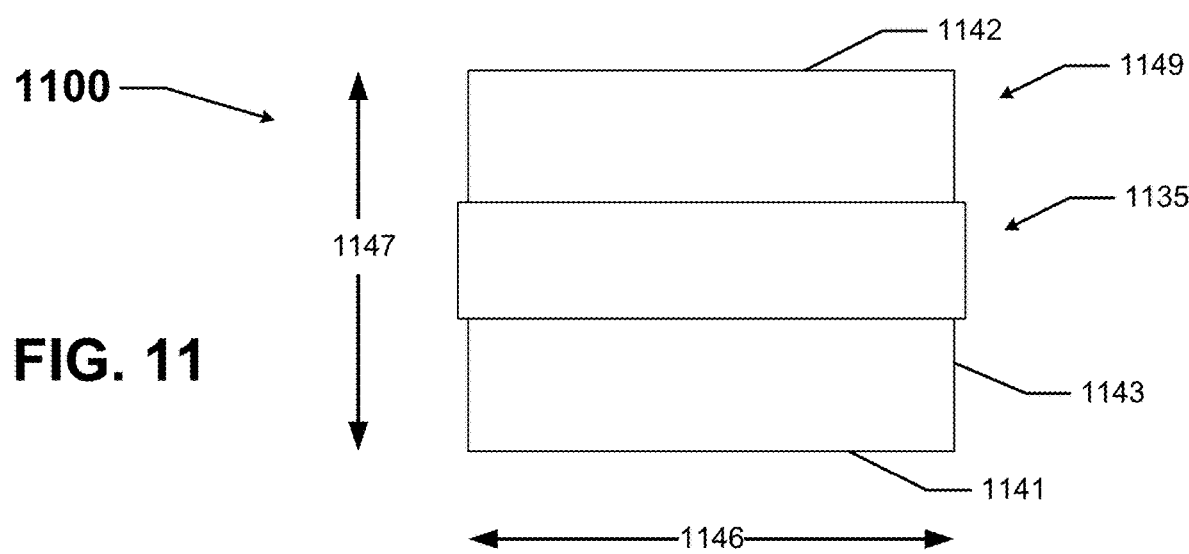
FIG. 11 shows still another target object in accordance with certain example embodiments.

Also, while the height 147 of the body 140 of FIGS. 1A-1D is shown as being greater than the width 146 of the body 149, in some cases (such as what is shown in FIGS. 9-11 below), the width 146 can be greater than the height 147. Also, while the surfaces of the body 149 of FIGS. 1A-1D are shown as being flat or featureless, any one or more sides of the body 149 can have any of a number of features and/or a non-flat profile. For example, if the object 100 is an aluminum can, the can can be smashed downward and used in this form in a game. Further, the body 149 can be made of one or more of any of a number of materials (e.g., rubber, plastic, ceramic, metal). The object 100 can be firm, flexible, resilient, and/or non-resilient.

The example object 100 also includes an interactive system 135 that includes one or more of a number of components. For example, as shown in FIGS. 1C and 1D, the interactive system 135 of the object 100 includes an interface 170 disposed on the top surface 142, a power supply 140, a sensor 160, and a controller 104. The interface 170 in this case includes a panel 174 on which is laid a display 171, a speaker 172, and an on/off button 173. The interface 170 can additionally or alternatively include any of a number of other components (e.g., a microphone, a dial, a pushbutton). The display 171 can be passive (e.g., view only) or interactive (e.g., touchscreen). The display 171 can show a count, a time, and/or any other element relevant to playing the game for which the object 100 is used.

The sensor 160 can be used to detect whether the object 100 is moved or contacted. For example, the sensor 160 can be a gyroscope. As another example, the sensor 160 can be a vibration sensor. The power supply 140, the sensor 160, and the controller 104 are all disposed within the cavity 103 of the body 149 of the object 100. There can also be any of a number of other features included in the interactive system 135 that are not shown in FIGS. 1A through 1D. For example, a small photovoltaic solar panel can be integrated with the panel 174 and coupled to the power supply 140. Additional details of the interface 170, the power supply 140, the sensor 160, and the controller 104 are provided below with respect to FIG. 6.

FIGS. 2 through 5 show an example of a game being played in accordance with certain example embodiments. Referring to FIGS. 1A through 5, FIG. 2 shows the game 299 at a first point in time. The game 299 in FIG. 2 includes player 250, player 350, object 200, and object 300. Object 200 and object 300 are substantially the same as each other as well as object 100 of FIGS. 1A through 1D. In other words, object 200 and object 300 each have an interactive system (e.g., interactive system 135).

Figure 2:
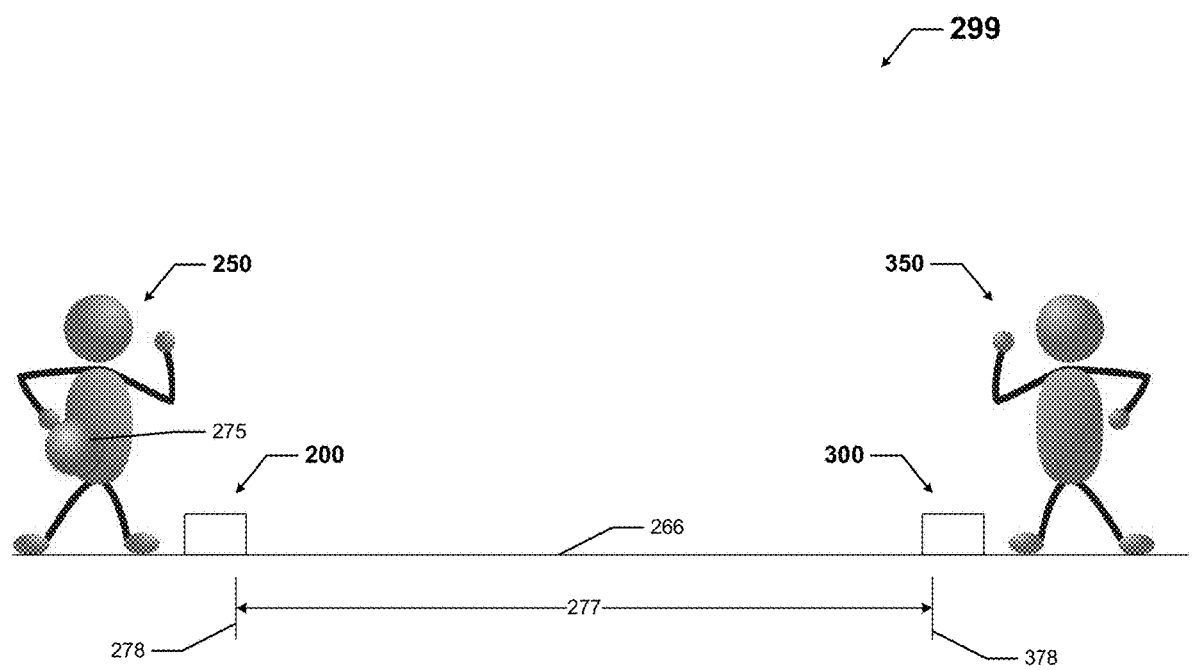
FIGS. 2 through 5 show an example of a game being played in accordance with certain example embodiments.

The game 299 in this case is where player 250 and player 350 take turns at trying to contact the other player's object (in this case, a can) using an initiating object 275 (in this case, a ball). As a result, object 200 and object 300 are called target objects 200 and 300. The first player to contact the opposing player's target object a certain number of times (e.g., 10, 20) wins the game. Target object 200 and target object 300 are spaced a distance 277 (e.g., 10 feet, 10 yards, 5 feet) apart from each other. Target object 200 and target object 300 are placed on a surface 266 (e.g., dirt, grass, concrete). The surface 266 can have any of a number of characteristics, including but not limited to flatness, leveled, sloped, undulating, and uneven. The surface 266 on which target object 200 is disposed can have the same characteristics as, or different characteristics from, the surface 266 on which target object 300 is disposed. Player 250 stands behind target object 200, and player 350 stands behind target object 300. In FIG. 2, player 250 has the initiating object 275.

The initiating object 275 can be any type of object that can be propelled by a player 250 (or any other type of user, such as user 650 described below with respect to FIG. 6). As discussed above, the initiating object 275 can be a ball. In such a case, the initiating object 275 can be one or more of any type of ball, including but not limited to a soccer ball, a basketball, a tennis ball, a bowling ball, a beach ball, a kick ball, a croquet ball, a bocci ball, a football, a foam ball, and a volley ball. The initiating object 275 can be any other type of object as well, including but not limited to a cylinder, a block, a plane, and a bean bag. The initiating object 275 can be firm, flexible, resilient, and/or non-resilient. The initiating object 275 can be made of one or more of any of a number of suitable materials (e.g., rubber, plastic, ceramic, metal).

When player 250 sends or propels the initiating object 275 toward target object 300, player 250 must do so from behind a dispatch boundary 278. In this case, the dispatch boundary 278 coincides with the location of target object 200. In an attempt to have the initiating object 275 contact target object 300, player 250 can dispatch (send, propel) the initiating object 275 in any of a number of ways in accordance with the rules. For example, initiating object 275 can be rolled with one hand, rolled with two hands, kicked, bounced, thrown overhand, thrown underhand, or dropped with spin.

Figure 3:
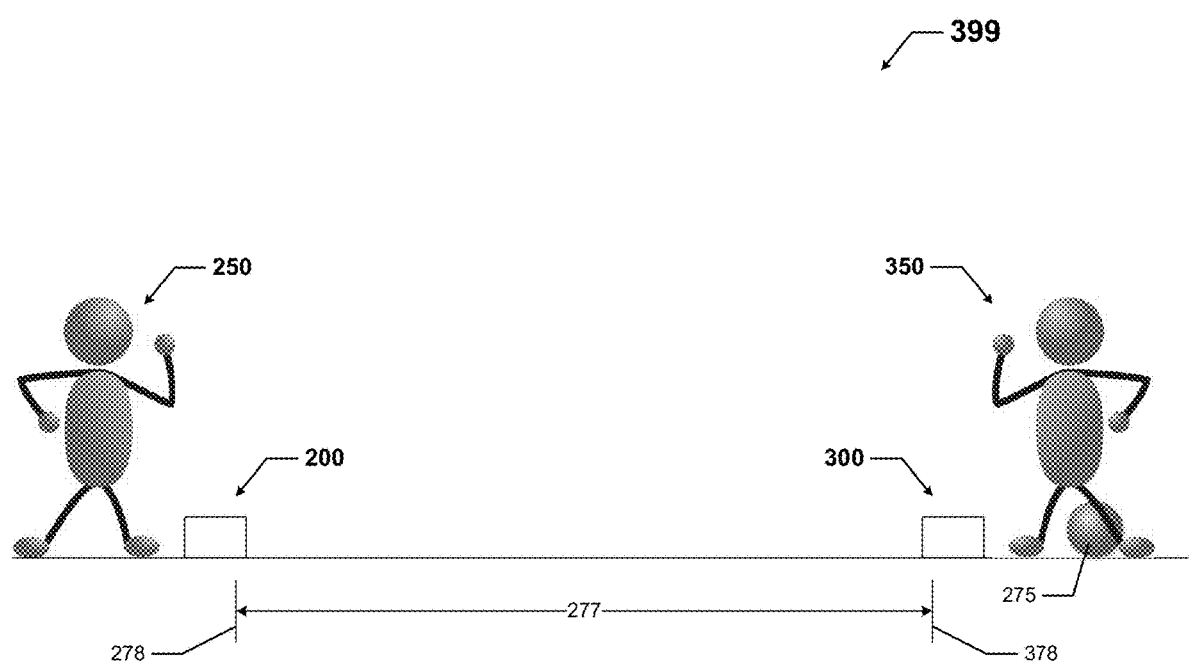
Figure 4:
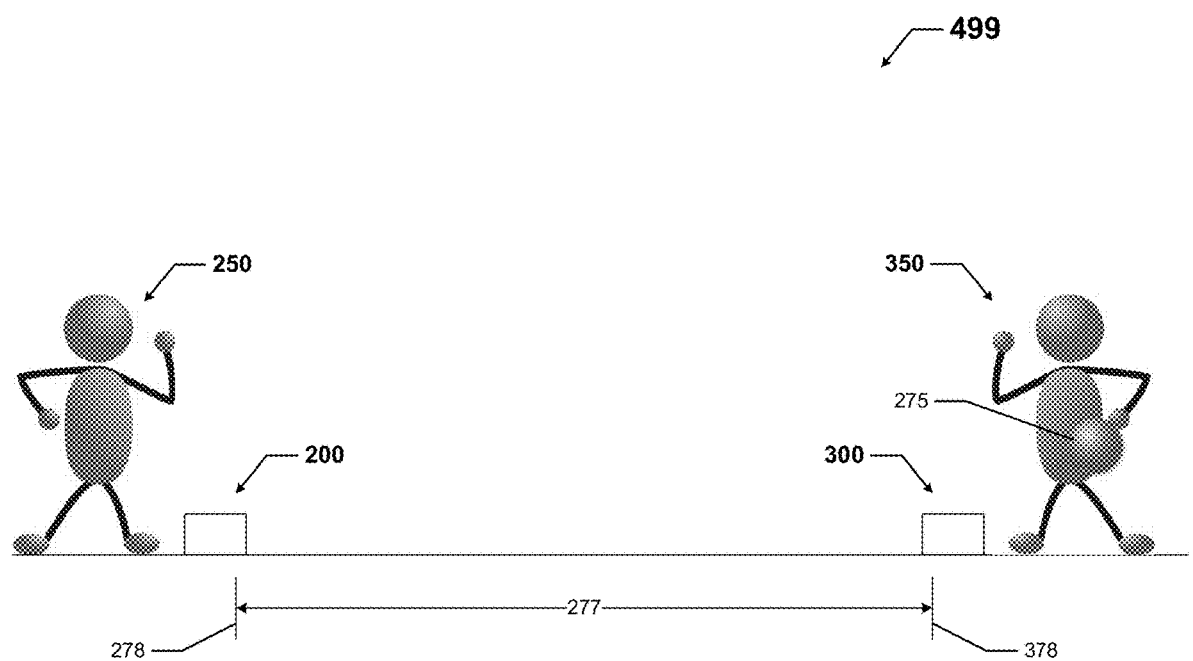

FIG. 3 shows the game 399 at a slightly later point in time relative to what is shown in FIG. 2. Specifically, in FIG. 3, the attempt by player 250 to contact target object 300 using initiating object 275 from FIG. 2 failed. As a result, the interactive system (e.g., interactive system 135) of object 300 fails to recognize that contact has been made by the initiating object 275, and the score of player 350 remains unchanged. FIG. 4 shows the game 499 at a slightly later point in time relative to what is shown in FIG. 3. Specifically, in FIG. 4, player 350, now in possession of the initiating object 275, takes a turn at trying to contact target object 200 using the initiating object 275 by any of the methods approved for the game 399. When player 350 sends or propels the initiating object 275, player 350 must do so from behind a dispatch boundary 378. In this case, the dispatch boundary 378 coincides with the location of target object 300.

Figure 5:
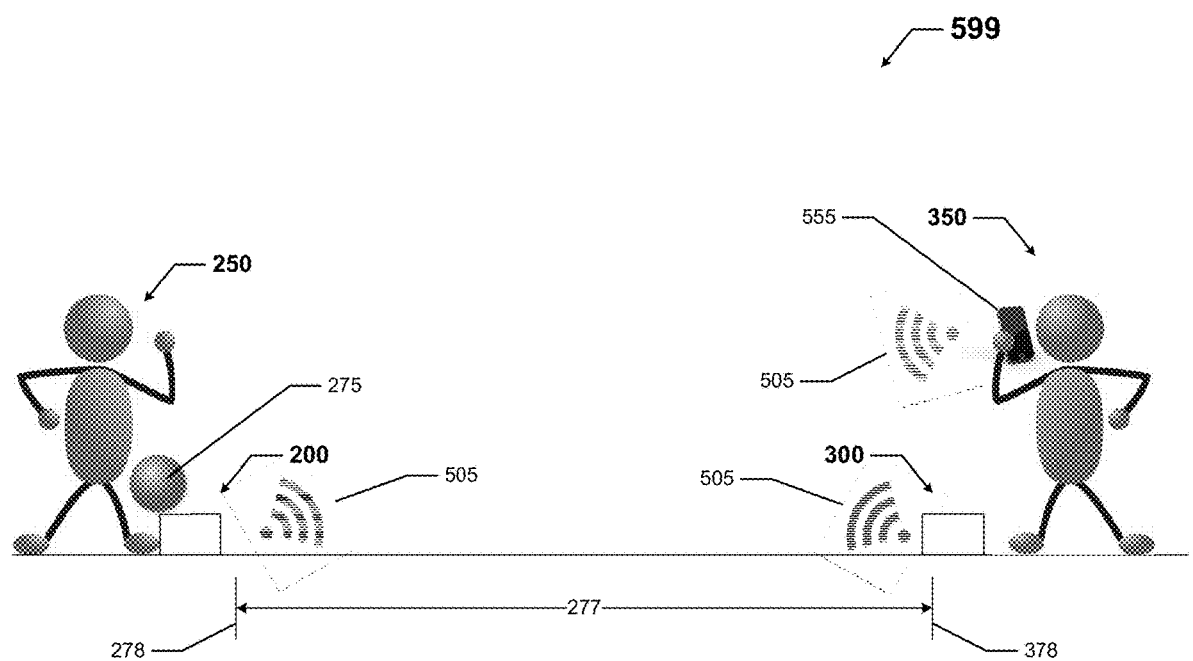

FIG. 5 shows the game 599 at a slightly later point in time relative to what is shown in FIG. 4. Specifically, in FIG. 5, the attempt by player 350 to contact target object 200 using initiating object 275 from FIG. 4 was successful. As a result, object 200 is contacted (and, more specifically in this case, knocked over). In such a case, a number of things can occur. For example, the interactive system (e.g., interactive system 135) of target object 200 can take one or more of a number of actions. Specifically, when the sensor (e.g., sensor 160) of the interactive system of target object 200 detects that target object 200 has been contacted, the controller (e.g., controller 104) of the interactive system of target object 200 can increment the count (e.g., from 2 to 3) for the score for player 350.

The controller of target object 200 can also, or in the alternative, send a sound recording to the speaker (speaker 172) of the interactive system of target object 200 to broadcast "You have scored another point. You are now winning 7 to 5." In addition, or in the alternative, the controller of the interactive system of target object 200 can send a communication signal, using a wireless communication link 505, to the controller of the interactive system of target object 300 to share the fact that player 350 contacted target object 200. In addition, or in the alternative, the controller of the interactive system of target object 200 can send a communication signal, using a wireless communication link 505, to a user system 555 (e.g., a mobile device) of player 350 to share the fact that player 350 contacted target object 200.

Figure 6:
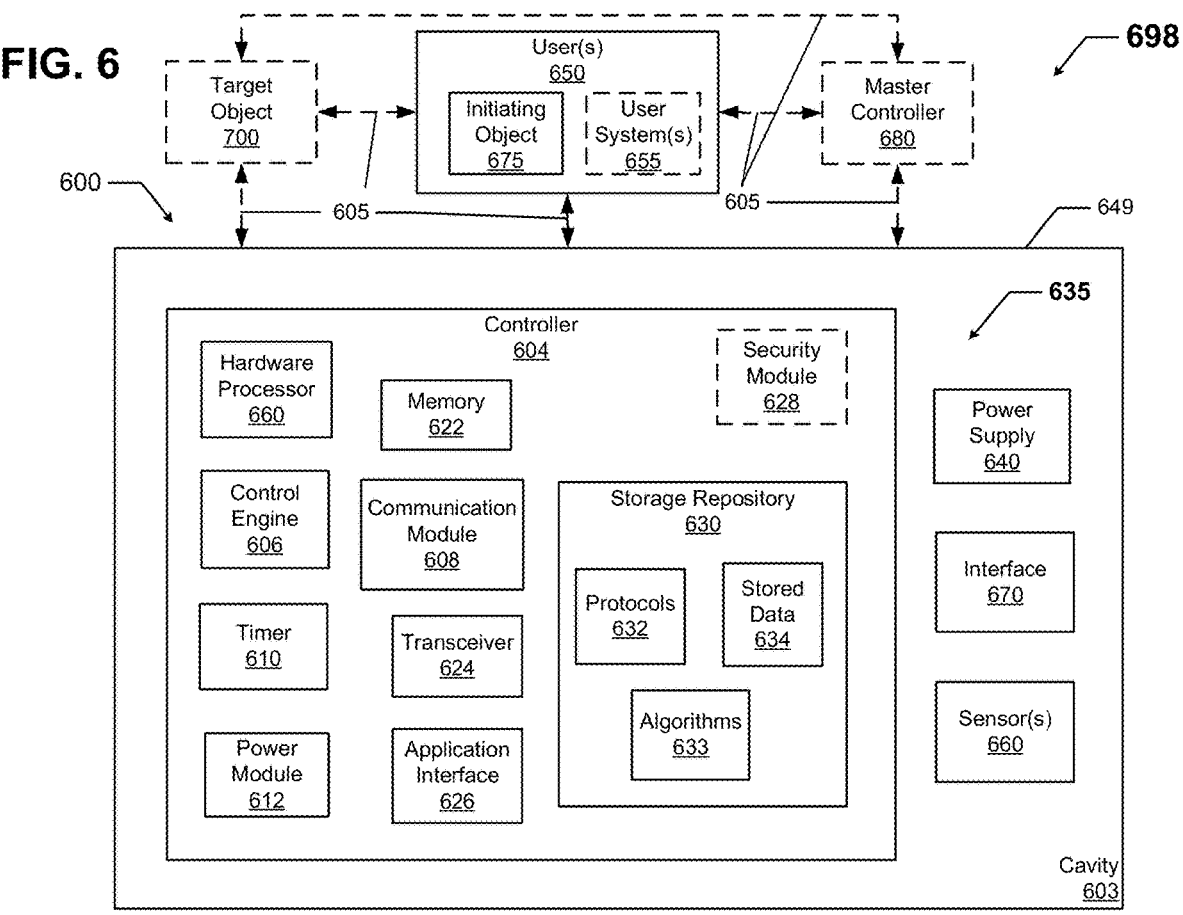
FIG. 6 shows a diagram of a system in accordance with certain example embodiments.

FIG. 6 shows a diagram of a system 698 that includes an object 600 (e.g., a target object) with an interactive system 635 in accordance with certain example embodiments. The system 698 can include a user 650 (which can include one or more optional user systems 655), the object 600, an optional master controller 689, and one or more optional other target objects 700680. In addition to the interactive system 635 can include a controller 604, a power supply 640, an interface 242, and one or more sensors 660 (also sometimes called sensor modules 660 or sensor devices 660).

The controller 604 can include one or more of a number of components. Such components, can include, but are not limited to, a control engine 606, a communication module 608, a timer 610, a power module 612, a storage repository 630, a hardware processor 60620, a memory 622, a transceiver 624, an application interface 628, and, optionally, a security module 628. The components shown in FIG. 6 are not exhaustive, and in some embodiments, one or more of the components shown in FIG. 6 may not be included in an example interactive system 635. Any component of the example interactive system 635 can be discrete or combined with one or more other components of the interactive system 635.

As described herein, a user 650 can be any person that interacts with a target object 600. Examples of a user 650 may include, but are not limited to, a consumer, an adult, a child, a toddler, and a manufacturer's representative. A user 650 can also be called a player herein. The user 650 can use one or more user systems 655, which may include a display (e.g., a GUI). The user 650 (including a user system 655) interacts with (e.g., sends data to, receives data from) the controller 604 of the interactive system 635 via the application interface 628 (described below). The user 650 (including a user system 655) can also interact with the master controller 680.

Interaction between the user 650 (including a user system 655), the interactive system 635 (or components thereof, such as the controller 604 and a sensor 660), and/or the optional master controller 680 is conducted using communication links 605. Each communication link 605 can include wired (e.g., Class 1 electrical cables, Class 2 electrical cables, electrical connectors, power line carrier, DALI, RS485) and/or wireless (e.g., Wi-Fi, visible light communication, cellular networking, UART, SPI, I2C, visible light communication (VLC), 802.15.4 wireless, ZigBee, 4G cellular wireless, Bluetooth, Bluetooth Low Energy (BLE), WirelessHART, ISA100) technology. For example, a communication link 605 can be (or include) one or more electrical conductors disposed within the body 649 of the object 600 for the example interactive system 635. The communication link 605 can transmit signals (e.g., power signals, communication signals, control signals, data) between the interactive system 635, the user 650 (including a user system 655), and/or the master controller 680.

A user 650 can also include an initiating object 675, which can be substantially similar to the initiating object 275 described above. An interactive game can include one initiating object 675 that is shared by multiple users 650. Alternatively, each user 650 can have their own initiating object 675. An initiating object 675 can be any type of object (e.g., a ball) that can be propelled by a user 650 toward a target object 600 in an attempt to contact the body 620 of the target object 600.

The optional master controller 680 is a device or component that controls all or a portion of a communication network that includes one or more user systems 655 of a user 650, the controller 604 of the interactive system 635 of the object 600, and the controllers of the interactive systems of the optional other objects 700. The master controller 680 can be substantially similar to the controller 604. Alternatively, the master controller 680 can include one or more of a number of features in addition to, or altered from, the features of the controller 604 described below.

As described herein, communication with the master controller 680 can include communicating with one or more other components (e.g., another interactive system 635) of the system 698 or another system. In such a case, the master controller 680 can facilitate such communication. Examples of functions that can be performed by the master controller 680 can include, but are not limited to, providing software upgrades to the controller 604 of the interactive system 635 of the object 600 and maintaining a history of scores from games played by a user 650.

The one or more sensors 660 of the interactive system 635 can be any type of sensing device that measures one or more parameters. Examples of types of sensors 660 can include, but are not limited to, a passive infrared sensor, a gyroscope, a microphone, a pressure sensor, a level detector, a proximity sensor, a SONAR sensor, a LIDAR sensor, a vibration sensor, and a camera. A parameter that can be measured by a sensor 660 can include, but is not limited to, motion, a position and/or orientation of the object 600, vibration, sound, distance, and time.

In some cases, the parameter or parameters measured by a sensor 660 can be used by the interactive system 635 to determine if the score in a game should be adjusted. For example, a sensor 660 can include a gyroscope so that the sensor 660 can recognize that the body 649 of the object has been contacted. As another example, a sensor 660 can include a vibration sensor to determine if there are sufficient vibrations to indicate that the body 649 of the object 600 has been contacted. As yet another example, a sensor 660 can include a pressure sensor to determine if there is enough of a change in pressure within the object 600 to indicate that the object 600 has been contacted. As still another example, a sensor 660 can determine whether a user (e.g., user 600, user 700) has crossed a boundary (e.g., boundary 278, boundary 378) when taking a turn in the game.

Each sensor 660 can use one or more of a number of communication protocols to communicate with the controller 604 of the interactive system 635. A sensor 660 can be located within the body 649 of the object 600, disposed on the body 649 of the object 600, or located outside (remotely from) the body 649 of the object 600. A sensor 600 can be dedicated to the interactive system 635. Alternatively, a sensor 660 can be pre-existing and have a shared use with another system (e.g., a security system when the sensor 600 is a camera). A sensor 660 can be part of, or separate from, the controller 604. In certain example embodiments, a sensor 660 can include a battery that is used to provide power, at least in part, to some or all of the rest of the sensor 660.

The interface 670 can be a component of the interactive system 635 that actively receives input from and/or provides output to the user 650. The interface 670 can be physical or virtual. Examples of such an interface 670 (or components thereof) can include, but are not limited to, a touch screen, a display, a mouse, a keyboard, a switch, a button, a stylus, a printer, and a speaker.

The power supply 640 of the interactive system 635 can provide power to one or more of the sensors 660, the interface 670, and the power module 612 of the controller 604 of the interactive system 635. The power supply 640 can be substantially the same as, or different than, the power module 612 (described below) of the controller 604. The power supply 640 can include one or more of a number of single or multiple discrete components (e.g., transistor, diode, resistor), and/or a microprocessor. The power supply 640 may include a printed circuit board, upon which a microprocessor and/or one or more discrete components are positioned.

The power supply 640 can include one or more components (e.g., a transformer, a diode bridge, an inverter, a converter) that receives power (for example, through an electrical cable) from a source external to the interactive system 635 and generates power of a type (e.g., alternating current, direct current) and level (e.g., 12V, 24V, 120V) that can be used by the sensors 660, the interface 670, and/or the power module 612. In addition, or in the alternative, the power supply 640 can receive power from the power module 612 of the controller 604. In addition, or in the alternative, the power supply 640 can be a source of power in itself. For example, the power supply 640 can include a battery, a localized photovoltaic power system, or some other source of independent power.

Each user 650 (including an associated user system 655), the master controller 680, and/or the controller of one or more other optional objects 700 can interact with the controller 604 of the interactive system 635 of the object 600 using the application interface 628 in accordance with one or more example embodiments. Specifically, the application interface 628 of the controller 604 receives data (e.g., information, communications, instructions, updates to firmware) from and sends data (e.g., information, communications, instructions) to each user 650 (including an associated user system 655), the master controller 680, and/or the controller of one or more other optional objects 700. Each user 650 (including an associated user system 655), the master controller 680, and/or the controller of one or more other optional objects 700 can include an interface to receive data from and send data to the controller 604 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

Each user 650 (including an associated user system 655), the master controller 680, the controller 604 of the interactive system 635 of object 600, and/or the controller of one or more other optional objects 700 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 604. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 7.

Further, as discussed above, such a system can have corresponding software (e.g., user software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 698. In some cases, when the interactive system 635 is integrated the body 649 of the object 600, the combination can be designed to comply with any applicable standards and/or so that the object 600 can be located in a particular environment (e.g., a humid environment, a cold environment).

The body 620 of the object 600 can be used to house one or more components of the interactive system 635, including one or more components of the controller 604. For example, as shown in FIG. 6, the controller 604 (which in this case includes the control engine 606, the communication module 608, the timer 610, the power module 612, the storage repository 630, the hardware processor 620, the memory 622, the transceiver 624, the application interface 628, and the optional security module 628), the power supply 640, the sensors 660, and the interface 670 can be disposed in the cavity 603 of the body 649 or integrated with the body 649.

In alternative embodiments, any one or more of these and/or other components of the interactive system 635 can be disposed on the body 649 and/or remotely from the body 649 of the object 600. When one or more components (e.g., power supply 640) of the interactive system 635 are disposed within the cavity 603 of the body 649, the body 649 can have an access panel, multiple pieces that detachably couple to each other, and/or some other configuration that allow a user 650 to access such one or more components.

The storage repository 630 can be a persistent storage device (or set of devices) that stores software and data used to assist the controller 604 in communicating with a user 650 (including any associated user system 655), the master controller 680, and/or another object 700 in the system 698. In one or more example embodiments, the storage repository 630 stores one or more protocols 632, algorithms 633, and stored data 634. The protocols 632 are any logic steps and/or methods followed by the control engine 606 based on certain conditions at a point in time. The protocols 632 can include any of a number of communication protocols that are used to send and/or receive data between the controller 604 and a user 650 (including any associated user system 655), the master controller 680, and the other objects 700. A protocol 632 can also include any of a number of processes for requesting and receiving information from one or more external systems 285 in the system 698.

A protocol 632 can also be a method by which to implement one or more stages (e.g., counting, determining whether the object 600 has been contacted) performed by the interactive system 635 in association with a game being played. One or more of the protocols 632 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 632 can provide a layer of security to the data transferred within the system 698.

The algorithms 633 can be any formulas, mathematical models, and/or other similar operational tools that the control engine 606 of the controller 604 uses. One or more algorithms 633 can be used in conjunction with one or more protocols 632. For example, a protocol 632 and an algorithm 633 can be used in combination to increment a count for a player when the sensor 660 detects that the body 649 of the object 600 has been contacted. An algorithm 633 and/or a protocol 632 can be fixed or modified (e.g., by a user 650 (including an associated user system 655), by the control engine 606) over time. Modification of an algorithm 633 or a protocol 632 can be based on one or more of a number of factors, including but not limited to an instruction from the network manager 680, an instruction from a user 650 (including an associated user system 655), and correction based on actual data.

Stored data 634 can be any data (e.g., player information, time to play a game) associated with the interactive system 635 (including any components thereof), any data associated with a user 650 (including an associated user system 655), any measurements taken by a sensor 660, settings for a sensor 660, threshold values, results of previously run or calculated algorithms 633, and/or any other suitable data. Such data can be any type of data, including but not limited to historical data, current data, and/or future data (e.g., forecasts). The stored data 634 can be associated with some measurement of time derived, for example, from the timer 610.

Examples of a storage repository 630 can include, but are not limited to, a database (or a number of databases), a file system, a hard drive, flash memory, some other form of solid state data storage, or any suitable combination thereof. The storage repository 630 can be located on multiple physical machines, each storing all or a portion of the protocols 632, the algorithms 633, and/or the stored data 634 according to some example embodiments. Each storage unit or device can be physically located in the same or in a different geographic location.

The storage repository 630 can be operatively connected to the control engine 606. In one or more example embodiments, the control engine 606 includes functionality to communicate with a user 650 (including any associated user devices 655), the master controller 680, and other objects 700 in the system 698. More specifically, the control engine 606 sends information to and/or receives information from the storage repository 630 in order to communicate with a user 650 (including any associated user devices 655), the master controller 680, and one or more other objects 700. As discussed below, the storage repository 630 can also be operatively connected to the communication module 608 in certain example embodiments.

In certain example embodiments, the control engine 606 of the controller 604 controls the operation of one or more components (e.g., the communication module 608, the timer 610, the transceiver 624) of the controller 604. For example, the control engine 606 can activate the communication module 608 when the communication module 608 is in "sleep" mode and when the communication module 608 is needed to send data received from another component (e.g., the network manager, a user system 655 of a user 650) in the system 698.

As another example, the control engine 606 can acquire the current time using the timer 610. The timer 610 can enable the controller 604 to control the interactive system 635 even when the controller 604 has no communication with the master controller 680. In some cases, the control engine 606 of the controller 604 can generate and send a signal to the power supply 640, which causes the interface 670 and/or one or more of the sensors 660 to operate.

The control engine 606 can be configured to perform a number of functions that help the interactive system 635 (or components thereof) perform one or more functions (e.g., counting, tracking time, broadcasting sound) associated with playing a game. As discussed above, the control engine 606 can execute any of the protocols 632 and/or the algorithms 633, using stored data 634 stored in the storage repository 630 and/or information provided by one or more users 650 (including any associated user systems 655), to perform one or more functions while a game is played.

For example, the control engine 606 can determine how many users 600,700 (e.g., players) are playing in a game. The control engine 606 can also determine the specific identify of each user 600,700 that is playing in a game. In this way, the control engine 606 can keep statistics (e.g., number of games played, win/loss record, average score per turn, average score per game, number of faults) for each user 600,700. As another example, the control engine 660 can interpret a measurement made by a sensor 660 and determine whether that measurement has exceeded some threshold value.

As a specific example, the control engine 660 can interpret, based on measurements made by a sensor 660 (e.g., a gyroscope, a vibration sensor) whether the body 649 of the object 600 has been contacted. As another specific example, the control engine 660 can interpret, based on measurements made by a sensor 660 (e.g., a laser, a motion sensor) whether a user (e.g., user 600, user 700) has crossed the boundary (e.g., boundary 278, boundary 378) during his/her turn.

As still another example, when the control engine 606 determines that a parameter measured by a sensor 660 has exceeded a threshold value, the control engine 606 can take some action. For example, if a value measured by a sensor 660 that measures the relative position of the body 649 of the object 600 exceeds a threshold value, the control engine 606 can increment a counter on a display (e.g., display 171) on the interface 670 and broadcast a recording saying "Player one has scored a point! Player one now trails six to five." As another example, if a value measured by a sensor 660 that measures whether a user (e.g., user 600) has crossed a boundary (e.g., boundary 278) exceeds a threshold value, the control engine 606 can decrement a counter on a display (e.g., display 171) on the interface 670 or broadcast a recording saying "Fault! You crossed the line during your turn. Your turn is forfeited. No points for you!"

The control engine 606 can also keep score and eventually determine a winner when the game is over according to the rules of the game. The control engine 606, in conjunction with one or more of the sensors 660, can act as a referee of the game. The control engine 606 can also answer a question posed by a user 650 about the status of an in-progress game and/or the rules of the game. There may be multiple interactive games that can be played. In such a case, the control engine 606 can facilitate (e.g., using the interface 670, by communicating with a user system 655) which game is being played by one or more users 650.

The control engine 606 can use one or more portions of the interface 670 to notify a user 600,700 about the status or some other aspect of the game throughout the game. In addition, or in the alternative, the control engine 606 can use the transceiver 624 and the communication module 608 to communicate to one or more user devices 655 regarding the status or some other aspect of the game throughout the game. The control engine 606 can access the rules of a game to answer an inquiry (e.g., spoken by a user 600,700, delivered by a user device 655) about the game.

The control engine 606 can provide control, communication, and/or other similar signals to a user 650 (including any associated user systems 655), the master controller 680, and/or another object 700. Similarly, the control engine 606 can receive control, communication, and/or other similar signals from a user 650 (including any associated user systems 655), the master controller 680, and/or another object 700.

The control engine 606 can control one or more of the sensors 660. The control engine 606 can control a sensor 660 automatically (for example, based on one or more protocols 632 or algorithms 633 stored in the control engine 606) and/or based on control, communication, and/or other similar signals received from another component of the system 698 through a communication link 605. The control engine 606 may include a printed circuit board, upon which the hardware processor 620 and/or one or more discrete components of the controller 604 are positioned.

In certain example embodiments, the control engine 606 can include an interface that enables the control engine 606 to communicate with one or more other components (e.g., power supply 640) of the interactive system 635. For example, if the power supply 640 of the interactive system 635 operates under IEC Standard 62386, then the power supply 640 can have a serial communication interface that will transfer data (e.g., stored data 634) measured by the sensors 660. In such a case, the control engine 606 can also include a serial interface to enable communication with the power supply 640 within the interactive system 635. Such an interface can operate in conjunction with, or independently of, the protocols 632 used to communicate between the controller 604 and a user 650 (including an associated user system 655), the master controller 680, and the other objects 700.

The control engine 606 (or other components of the controller 604) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

The communication module 608 of the controller 604 determines and implements the communication protocol (e.g., from the protocols 632 of the storage repository 630) that is used when the control engine 606 communicates with (e.g., sends signals to, receives signals from) a user 650 (including an associated user system 655), the master controller 680, and the other objects 700. In some cases, the communication module 608 accesses the stored data 634 to determine which communication protocol is used to communicate with an external system 285 associated with the stored data 634. In addition, the communication module 608 can interpret the communication protocol of a communication received by the controller 604 so that the control engine 606 can interpret the communication.

The communication module 608 can send and receive data between the master controller 680, the sensors 660, the other objects 700, a user 650 (including an associated user system 655), and the controller 604. The communication module 608 can send and/or receive data in a given format that follows a particular protocol 632. The control engine 606 can interpret the data packet received from the communication module 608 using the protocol 632 information stored in the storage repository 630. The control engine 606 can also facilitate the data transfer between one or more sensors 660 and the master controller 680, the other objects 700, and/or a user 650 (including an associated user system 655) by converting the data into a format understood by the communication module 608.

The communication module 608 can send data (e.g., protocols 632, algorithms 633, stored data 634, operational information, game results) directly to and/or retrieve data directly from the storage repository 630. Alternatively, the control engine 606 can facilitate the transfer of data between the communication module 608 and the storage repository 630. The communication module 608 can also provide encryption to data that is sent by the controller 604 and decryption to data that is received by the controller 604. The communication module 608 can also provide one or more of a number of other services with respect to data sent from and received by the controller 604. Such services can include, but are not limited to, data packet routing information and procedures to follow in the event of data interruption.

The timer 610 of the controller 604 can track clock time, intervals of time, an amount of time, and/or any other measure of time. The timer 610 can also count the number of occurrences of an event, whether with or without respect to time. Alternatively, the control engine 606 can perform the counting function. The timer 610 is able to track multiple time measurements concurrently. The timer 610 can track time periods based on an instruction received from the control engine 606, based on an instruction received from the user 650, based on an instruction programmed in the software for the controller 604, based on some other condition or from some other component, or from any combination thereof.

The timer 610 can be configured to track time when there is no power delivered to the controller 604 (e.g., the power module 612 malfunctions) using, for example, a super capacitor or a battery backup. In such a case, when there is a resumption of power delivery to the controller 604, the timer 610 can communicate any aspect of time to the controller 604. In such a case, the timer 610 can include one or more of a number of components (e.g., a super capacitor, an integrated circuit) to perform these functions.

The power module 612 of the controller 604 provides power to one or more other components (e.g., timer 610, control engine 606) of the controller 604. In addition, in certain example embodiments, the power module 612 can provide power to the power supply 640 of the interactive system 635. The power module 612 can include one or more of a number of single or multiple discrete components (e.g., transistor, diode, resistor), and/or a microprocessor. The power module 612 may include a printed circuit board, upon which the microprocessor and/or one or more discrete components are positioned. In some cases, the power module 612 can include one or more components that allow the power module 612 to measure one or more elements of power (e.g., voltage, current) that is delivered to and/or sent from the power module 612, The power module 612 can receive power (for example, through an electrical cable) from a source (e.g., the power supply 640) external to the controller 604 and generates power of a type (e.g., alternating current, direct current) and level (e.g., 12V, 24V, 120V) that can be used by the other components of the controller 604. The power module 612 can use a closed control loop to maintain a preconfigured voltage or current with a tight tolerance at the output. The power module 612 can also protect the rest of the electronics (e.g., hardware processor 620, transceiver 624) in the interactive system 635 from surges generated in the line. In addition, or in the alternative, the power module 612 can include a source of power in itself to provide signals to the other components of the controller 604. For example, the power module 612 can include a battery. As another example, the power module 612 can include a localized photovoltaic power system.

In certain example embodiments, the power module 612 of the controller 604 can also provide power and/or control signals, directly or indirectly, to one or more of the sensors 660. In such a case, the control engine 606 can direct the power generated by the power module 612 to the sensors 660 and/or the interface 670 of the interactive system 635. In this way, power can be conserved by sending power to the sensors 660 and/or the interface 670 of the interactive system 635 when those components need power, as determined by the control engine 606.

The hardware processor 620 of the controller 604 executes software, algorithms, and firmware in accordance with one or more example embodiments. Specifically, the hardware processor 620 can execute software on the control engine 606 or any other portion of the controller 604, as well as software used by a user system 655, the master controller 680, the other objects, and/or one or more of the sensors 660. The hardware processor 620 can be an integrated circuit, a central processing unit, a multi-core processing chip, SoC, a multi-chip module including multiple multi-core processing chips, or other hardware processor in one or more example embodiments. The hardware processor 620 is known by other names, including but not limited to a computer processor, a microprocessor, and a multi-core processor.

In one or more example embodiments, the hardware processor 620 executes software instructions stored in memory 622. The memory 622 includes one or more cache memories, main memory, and/or any other suitable type of memory. The memory 622 can include volatile and/or non-volatile memory. The memory 622 is discretely located within the controller 604 relative to the hardware processor 620 according to some example embodiments. In certain configurations, the memory 622 can be integrated with the hardware processor 620.

In certain example embodiments, the controller 604 does not include a hardware processor 620. In such a case, the controller 604 can include, as an example, one or more field programmable gate arrays (FPGA), insulated-gate bipolar transistors (IGBTs), and integrated circuits (ICs). Using FPGAs, IGBTs, ICs, and/or other similar devices known in the art allows the controller 604 (or portions thereof) to be programmable and function according to certain logic rules and thresholds without the use of a hardware processor. Alternatively, FPGAs, IGBTs, ICs, and/or similar devices can be used in conjunction with one or more hardware processors 620.

The transceiver 624 of the controller 604 can send and/or receive control and/or communication signals. Specifically, the transceiver 624 can be used to transfer data between the controller 604 and a user 650 (including an associated user system 655), the master controller 680, one or more other objects 700, and/or the sensors 660 (e.g., if remote from the interactive system 635). The transceiver 624 can use wired and/or wireless technology. The transceiver 624 can be configured in such a way that the control and/or communication signals sent and/or received by the transceiver 624 can be received and/or sent by another transceiver that is part of a user system 655, the master controller 680, one or more other objects 700, and/or the sensors 660. The transceiver 624 can use any of a number of signal types, including but not limited to radio frequency signals.

When the transceiver 624 uses wireless technology, any type of wireless technology can be used by the transceiver 624 in sending and receiving signals. Such wireless technology can include, but is not limited to, Wi-Fi, visible light communication (VLC), cellular networking, UART, SPI, I2C, 802.15.4 wireless, ZigBee, 4G cellular wireless, BLE, and Bluetooth. The transceiver 624 can use one or more of any number of suitable communication protocols (e.g., ISA100, HART) when sending and/or receiving signals. Such communication protocols can be stored in the protocols 632 of the storage repository 630. Further, any transceiver information for a user system 655, the master controller 680, the other objects 700, and/or the sensors 660 can be part of the stored data 634 (or similar areas) of the storage repository 630.

Optionally, in one or more example embodiments, the security module 628 secures interactions between the controller 604, a user 650 (including an associated user system 655), the master controller 680, the other objects 700, and/or the sensors 660. More specifically, the security module 628 authenticates communication from software based on security keys verifying the identity of the source of the communication. For example, user software may be associated with a security key enabling the software of the user 650 to interact with the controller 604 and/or the external systems 285. Further, the security module 628 can restrict receipt of information, requests for information, and/or access to information in some example embodiments.

Figure 7:
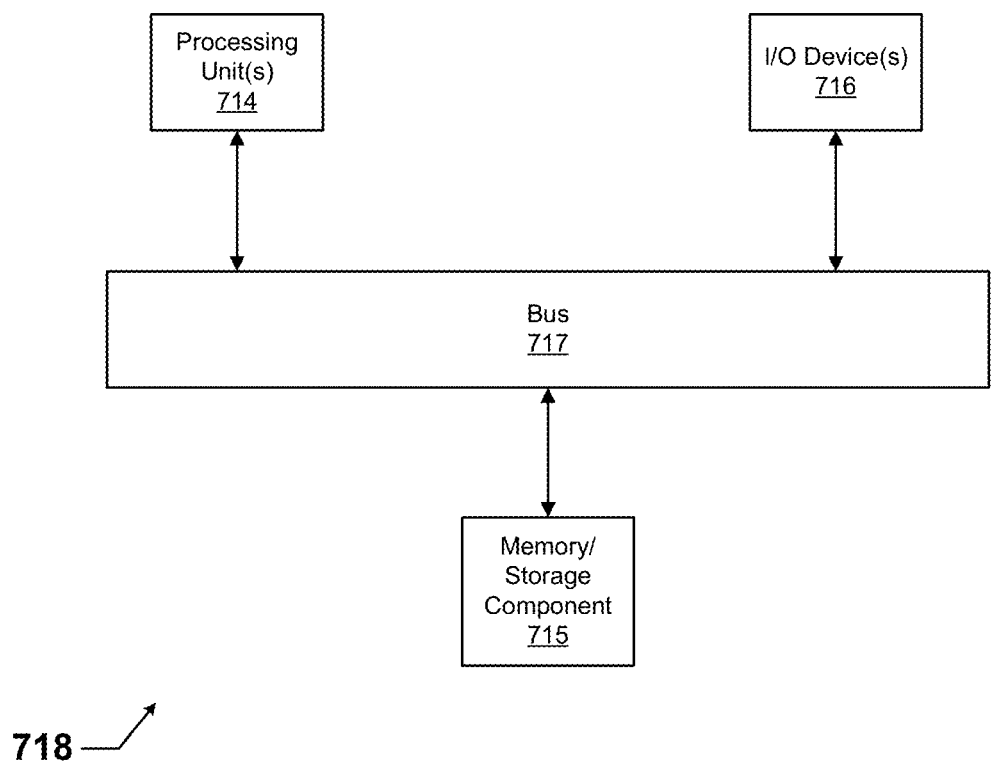
FIG. 7 shows a computing device in accordance with one or more example embodiments.

FIG. 7 illustrates one embodiment of a computing device 718 that implements one or more of the various techniques described herein, and which is representative, in whole or in part, of the elements described herein pursuant to certain exemplary embodiments. For example, computing device 718 can be implemented in the interactive system 635 of FIG. 6 in the form of the hardware processor 620, the memory 622, and the storage repository 630, among other components. Computing device 718 is one example of a computing device and is not intended to suggest any limitation as to scope of use or functionality of the computing device and/or its possible architectures. Neither should computing device 718 be interpreted as having any dependency or requirement relating to any one or combination of components illustrated in the example computing device 718.

Computing device 718 includes one or more processors or processing units 714, one or more memory/storage components 715, one or more input/output (I/O) devices 716, and a bus 717 that allows the various components and devices to communicate with one another. Bus 717 represents one or more of any of several types of bus structures, including a memory bus or memory controller, a peripheral bus, an accelerated graphics port, and a processor or local bus using any of a variety of bus architectures. Bus 717 includes wired and/or wireless buses.

Memory/storage component 715 represents one or more computer storage media. Memory/storage component 715 includes volatile media (such as random access memory (RAM)) and/or nonvolatile media (such as read only memory (ROM), flash memory, optical disks, magnetic disks, and so forth). Memory/storage component 715 includes fixed media (e.g., RAM, ROM, a fixed hard drive, etc.) as well as removable media (e.g., a Flash memory drive, a removable hard drive, an optical disk, and so forth).

One or more I/O devices 716 allow a customer, utility, or other user to enter commands and information to computing device 718, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 718 is connected to a network (not shown) (e.g., a LAN, a WAN such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 718 includes at least the minimal processing, input, and/or output means necessary to practice one or more embodiments.

Further, those skilled in the art will appreciate that one or more elements of the aforementioned computer device 718 is located at a remote location and connected to the other elements over a network in certain exemplary embodiments. Further, one or more embodiments is implemented on a distributed system having one or more nodes, where each portion of the implementation (e.g., control engine 606) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 8:
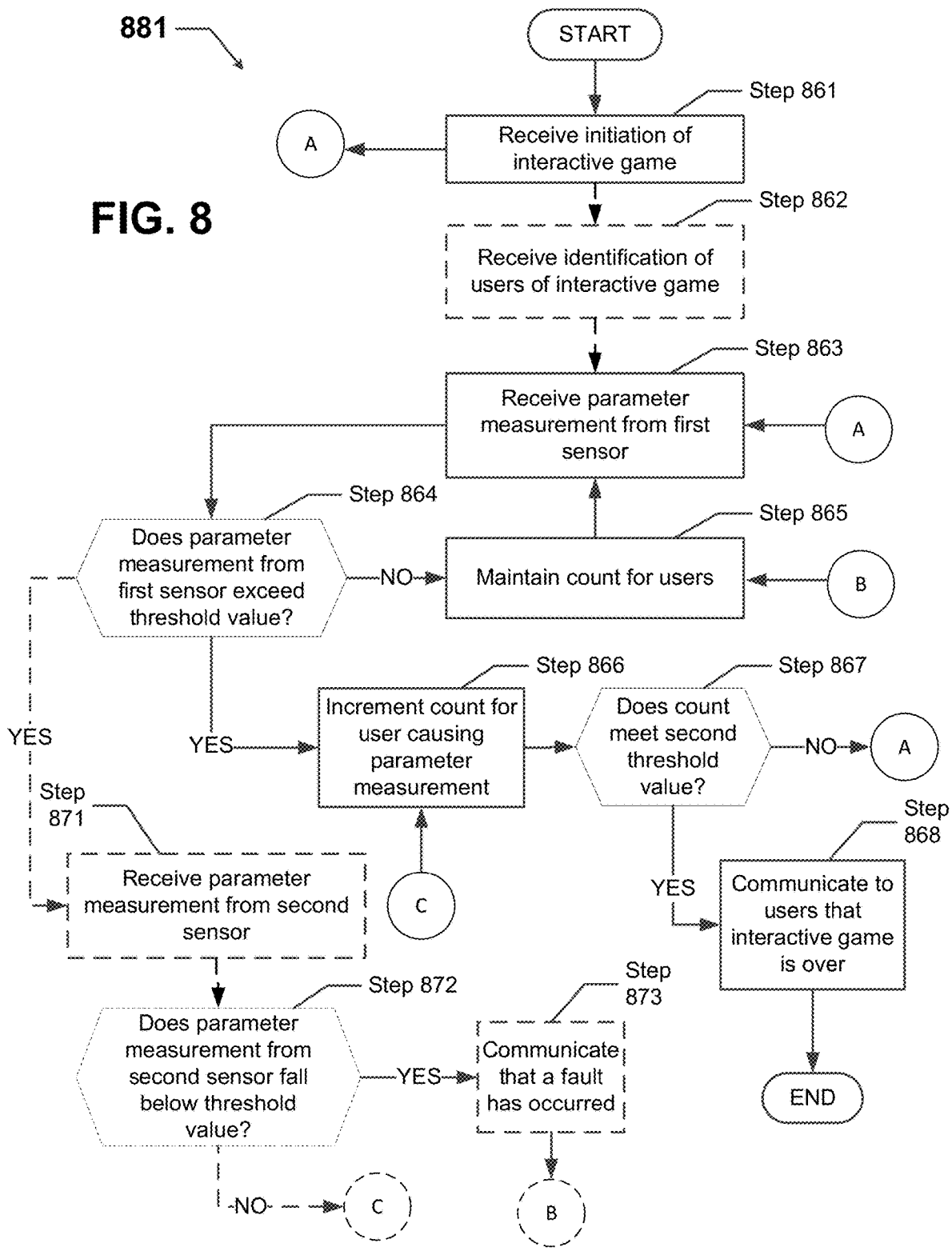
FIG. 8 shows a flowchart of a method for automatically scoring activity in a game contacting smart objects in accordance with certain example embodiments.

FIG. 8 shows a flowchart of a method 800 for playing an interactive game in accordance with certain example embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the example embodiments, one or more of the steps described below may be omitted, repeated, and/or performed in a different order.

In addition, a person of ordinary skill in the art will appreciate that additional steps not shown in FIG. 8 may be included in performing this method 800. Accordingly, the specific arrangement of steps should not be construed as limiting the scope. Further, a particular computing device, as described, for example, in FIG. 7 above, can be used to perform one or more of the steps (or portions thereof) for the method 800 described below in certain exemplary embodiments.

Referring now to FIGS. 1A-8, the method 881 begins at the START step and proceeds to step 861, where an initiation of an interactive game is received. The initiation of the interactive game can be received by the interactive system 635, which can involve the use of the interface 670 (e.g., an on/off button 173, a signal from a user device 655) and/or one or more sensors 660 (e.g., if a gyroscope, in conjunction with the controller 604, determines that the body 620 of the target object 600 is oriented in a way that is used during a game). The initiation of an interactive game can cause the controller 604 to activate one or more other components of the interactive system 635 and/or bring such other components out of "sleep" mode. The initiation is made by a user 650, which can include a user system 655. If optional step 862 is not used, the process proceeds to step 863.

In optional step 862, the identification of the users 650 (also called players herein) of the interactive game is received. The identification of each user 650 can include one or more of a number of elements, including but not limited to an age, a gender, a photograph, a voice print, and a fingerprint. The identification of each user 650 can be used for one or more of any of a number of purposes, including but not limited to tracking user 650 statistics (e.g., win/loss percentage, turns per game, number of games), security, and applicable rules of the game. The identification of a user 650 game can be received by the interactive system 635, which can involve the use of the interface 670 (e.g., a signal received from a user device 655) and/or one or more sensors 660 (e.g., a voice print received through a microphone). Some of the identification of a user 650 can be stored in the storage repository 630 and/or the network manager 680.

In step 863, a parameter measurement is received from a first sensor 660. The parameter measurement can be associated with a change in orientation of the body 620 of the target object 600, as when an initiating object 675 (e.g., a ball) propelled by a user 650 contacts the body 620 of the target object 600. Examples of a sensor 660 can include, but are not limited to, a gyroscope and a vibration sensor. The parameter measurement is received by the control engine 606 of the controller 604 of the interactive system 635.

In step 864, a determination is made as to whether the parameter measurement from the first sensor exceeds a threshold value. The threshold value can be among the stored data 634 in the storage repository 630. The determination can be made by the control engine 606 using one or more algorithms 633 and/or one or more protocols 632. The threshold value can represent a minimum amount of movement or change in orientation of the body 620 of the target object 600. If the parameter measurement exceeds the threshold value, then the process proceeds to step 866. In some cases, if the parameter measurement exceeds the threshold value, then the process proceeds to optional step 871. If the parameter measurement does not exceed the threshold value, then the process proceeds to step 865.

In step 865, the count for the users 650 is maintained. The count represents the score of each user 650 in the interactive game. The count can be maintained by the control engine 606 of the controller 604. Maintaining the count means that, in the most recent turn in the interactive game, the user 650 failed to contact the body 620 of the target object 600 using the initiating object 675. When step 865 is concluded, the process reverts to step 863.

In step 866, the count for the user 650 causing the parameter measurement is incremented. The count can be incremented by the control engine 606 of the controller 604. Incrementing the count means that, in the most recent turn in the interactive game, the user 650 contacted the body 620 of the target object 600 using the initiating object 675.

In step 867, a determination is made as to whether the count meets a threshold value. The determination can be made by the control engine 606 of the controller 604 using one or more protocols 632 and/or one or more algorithms 633. The threshold value can be part of the stored data 634 in the storage repository 630. The threshold value in this case can represent the number of points needed by a user 650 to win the interactive game. If the count meets the threshold value, then the process proceeds to step 868. If the count does not meet the threshold value, then the process reverts to step 863.

In step 868, a communication is sent to the users 650 that the interactive game is over. The communication can be sent by the control engine 606 of the controller 604 of the interactive system 635. The users 650 receiving the communication can include any user devices 655 associated with the users 650. The communication can take one or more of a number of forms, including but not limited to sound (e.g., spoken words, a victory song) broadcast through a speaker (e.g., speaker 172) of the interface 670, via a text message to one or more user devices 655, showing text on a display 171 of the interface 670, and updating a website for the interactive game. When step 868 is complete, the process can proceed to the END step.

In optional step 871, a parameter measurement is received from a second sensor 660. The parameter measurement can be associated with a location of a user 650 when the initiating object 675 is being propelled by the user 650. Examples of a sensor 660 can include, but are not limited to, a camera, a motion sensor, and an infrared sensor. The parameter measurement is received by the control engine 606 of the controller 604 of the interactive system 635. This step 871 can be used to help ensure that the rules of the interactive game are followed in that each user 650 must be at least a certain distance (e.g., distance 277) from the target object 600 when propelling the initiating object 675.

In optional step 872, a determination is made as to whether the parameter measurement from the second sensor falls below a threshold value. The threshold value can be among the stored data 634 in the storage repository 630. The determination can be made by the control engine 606 using one or more algorithms 633 and/or one or more protocols 632. The threshold value can represent a minimum distance between a user 650 and the target object 600. If the parameter measurement falls below the threshold value, then the process proceeds to optional step 873. If the parameter measurement does not fall below the threshold value, then the process reverts to step 866.

In optional step 873, a communication is made that a fault has occurred. The communication can be sent by the control engine 606 of the controller 604 of the interactive system 635. The users 650 receiving the communication can include any user devices 655 associated with the users 650. The communication can take one or more of a number of forms, including but not limited to sound (e.g., spoken words, a sad song) broadcast through a speaker (e.g., speaker 172) of the interface 670, via a text message to one or more user devices 655, showing text on a display 171 of the interface 670, and updating a website for the interactive game. When step 868 is complete, the process reverts to step 865.

FIG. 9 shows a side view of another target object 900 in accordance with certain example embodiments. Referring to FIGS. 1A through 9, the target object 900 of FIG. 9 is substantially similar to the target object 100 of FIGS. 1A through 1D. For example, the target object 900 of FIG. 9 has a body 949, which has a top surface 942, a bottom surface 941, and at least one side surface 943. The shape of the body 949 of the object 900 in this example is cylindrical, having a height 947 and a diameter/width 946, where the height 947 is significantly less than the width 946. The interactive system associated with the target object 900 can be located on the top surface 942 and/or within the cavity formed by the various surfaces of the body 949.

In some cases, as shown in FIGS. 10 and 11, the interactive system can be removably coupled to a target object, as opposed to being integrated with a target object, such as what has been shown above. FIG. 10 shows a side view of yet another target object 1000 in accordance with certain example embodiments. FIG. 11 shows a side view of still another target object 1100 in accordance with certain example embodiments.

Referring to FIGS. 1A through 11, the target object 1000 of FIG. 10 is substantially similar to the target objects shown in FIGS. 1A through 9, except as described below. For example, the target object 1000 of FIG. 10 has a body 1049, which has a top surface (hidden from view by the interactive system 1035), a bottom surface 1041, and at least one side surface 1043. The shape of the body 1049 of the object 1000 in this example is cylindrical, having a height 1047 and a diameter/width 1046, where the height 1047 is slightly less than the width 1046.

The interactive system 1035 associated with the target object 1000 in this case is a self-contained component that is disposed over the top surface and the upper part of the side surface 1043 of the body 1049. For example, the interactive system 1035 can include a sleeve (e.g., made of hard plastic, made of resilient elastic) that slides over the top of the body 1049 of the target object 1000. In this way, the interactive system 1035 can be used with any of a number of target objects that have at least part of a body with similar features that allow the interactive system 1035 to be applied to or removed from each target object.

Similarly, the target object 1100 of FIG. 11 is substantially similar to the target objects shown in FIGS. 1A through 10, except as described below. For example, the target object 1100 of FIG. 11 has a body 1149, which has a top surface 1142, a bottom surface 1141, and at least one side surface 1143. The shape of the body 1149 of the object 1100 in this example is cylindrical, having a height 1147 and a diameter/width 1146, where the height 1147 is slightly less than the width 1146.

The interactive system 1135 associated with the target object 1100 in this case is a self-contained component that is disposed around the side surface 1143 of the body 1149. For example, the interactive system 1135 can include a strap (e.g., made of elastic, made with coupling features such as a snap or a hook-and-loop fastener) that wraps around part of the body 1149 of the target object 1100. In this way, the interactive system 1135 can be used with any of a number of target objects that have a range of different sizes that allow the interactive system 1135 to be applied to or removed from each target object.

This transportability of an interactive system in certain example embodiments, as shown by way of example with the interactive system 1035 of FIG. 10 and the interactive system 1135 of FIG. 11, can allow for the use of target objects having a wide range of shapes and sizes in playing an interactive game. Similarly, this transportability of an interactive system can transform a "dumb" target object into a smart target object for the amount of time that the interactive system is disposed on the target object.

Example embodiments are used for an interactive game. Example embodiments can provide a number of benefits. Examples of such benefits can include, but are not limited to, automated scoring and enforcement of game rules, ease of use, interactive experience for users, encouragement of physical activity of users, and tracking user statistics. Example embodiments can be used indoors or outdoors. Example embodiments can also provide an interactive interface with a user to play a game in real time.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An interactive game comprising:
   a target object comprising a body, a controller, and a sensor coupled to the controller, wherein the sensor measures a parameter that indicates when the body is moved from a prior position by an initiating object,
   wherein the initiating object is propelled toward the target object by a player positioned a minimum distance from the target object, wherein the prior position is a location of the body when the player is about to propel the initiating object toward the target object, wherein the controller, based on the parameter measured by the sensor, determines when the initiating object moves the body of the target object from the prior position and increments a score of the player for moving the body of the target object from the prior position, wherein the controller communicates the score of the player, wherein the controller stores rules of the interactive game, and wherein the controller uses an interface to recite the rules to the player in response to an inquiry about the rules received from the player.

2. The interactive game of claim 1, further comprising: a second target object comprising a second body, a second controller, and a second sensor coupled to the second controller, wherein the second sensor measures the parameter that indicates when the second body is moved from a second prior position by the initiating object propelled toward the second target object by a second player positioned the minimum distance from the second target object, wherein the second prior position is a second location of the second body when the second player is about to propel the initiating object toward the second target object, wherein the second controller, based on the parameter measuring by the second sensor, determines when the initiating object moves the second target object from the second prior position and increments a second score of the second player for moving the second target object from the second prior position, wherein the second controller communicates the second score of second player.

3. The interactive game of claim 2, wherein the controller and the second controller communicate with each other to track and communicate the score to the player and the second score of the second player.

4. The interactive game of claim 1, wherein the sensor comprises a gyroscope, and wherein the parameter is a relative position of the body of the target object.

5. The interactive game of claim 1, wherein the score is communicated by the controller using a display disposed on a surface of the body of the target object.

6. The interactive game of claim 1, wherein the score is communicated by the controller using a speaker integrated with the target object.

7. The interactive game of claim 1, wherein the score is communicated by the controller to a user device of the player using a transceiver.

8. The interactive game of claim 1, wherein the initiating object is a ball.

9. The interactive game of claim 1, wherein the interface comprises a display.

10. The interactive game of claim 1, wherein the body is in the form of a cylinder.

11. A method for overseeing an interactive game, the method comprising:
receiving a first parameter measurement of a first parameter measured by a first sensor of a target object, wherein the first parameter indicates that a body of the target object has been moved from a prior position by an initiating object propelled the body by a user, wherein the prior position is a location of the body when the user is about to propel the initiating object toward the target object;

determining whether the first parameter measurement exceeds a first threshold value to indicate that the body of the target object has been moved from the prior position;

receiving a second parameter measurement of a second parameter measured by a second sensor, wherein the second parameter indicates whether the user is located at least a minimum distance from the target object when the user is about to propel the initiating object toward the body by the user;

determining whether the second parameter measurement exceeds a second threshold value to indicate that the user is located at least the minimum distance from the target object when the user is about to propel the initiating object toward the body by the user;

incrementing a score of the user that propelled the initiating object when the first parameter measurement exceeds the first threshold value and when the second parameter measurement exceeds the second threshold value;

declaring a fault when the second parameter measurement fails to exceed the second threshold value; and communicating the score of the user.

12. The method of claim 11, further comprising:
receiving a third parameter measurement of the first parameter measured by a second sensor, wherein the third parameter measurement indicates whether a second body of a second target object is moved from a second prior position by the initiating object propelled toward the second body by a second user competing against the first user, wherein the second prior position is a location of the second body when the second user is about to propel the initiating object toward the second target object;

determining whether the third parameter measurement exceeds the first threshold value to indicate that the second body of the second target object has been moved from the second prior position;

incrementing a second count of the second user when the third parameter measurement exceeds the first threshold value; and communicating the first count and the second count.

13. An interactive game comprising:
a target object comprising a body, a controller, a solar panel that provides power to the controller, and a sensor coupled to the controller, wherein the body is configured to be moved from a prior position, wherein the sensor measures a parameter that indicates when the body is moved from the prior position by an initiating object that is propelled toward the body by a player positioned a distance from the body, wherein the prior position is a location of the body when the player is about to propel the initiating object toward the target object, wherein the controller, based on the parameter measured by the sensor, determines when the initiating object moves the body from the prior position and awards a point to the player for moving the body from the prior position, wherein the controller communicates a score of the player, wherein the controller and the sensor are part of an integrated system that is separable from and disposed on the body of the target object.

14. The interactive game of claim 13, wherein the target object lacks a battery.

15. The interactive game of claim 1, wherein the controller and the sensor are part of an integrated system that is separable from and disposed on the body of the target object.

16. The interactive game of claim 15, wherein the integrated system is movable along an outer surface of the body of the target object.

17. The interactive game of claim 1, wherein the controller and the sensor are part of an integrated system that is separable from and disposed within the body of the target object.

18. The interactive game of claim 1, wherein the target object further comprises a second sensor that measures a second parameter, wherein the second parameter indicates whether the user is located at least the minimum distance from the target object, wherein the controller declares a fault when the user is located within the minimum distance.

* * * * *